(12) United States Patent
Fascenda

(10) Patent No.: US 8,301,891 B2
(45) Date of Patent: Oct. 30, 2012

(54) LOCALIZED NETWORK AUTHENTICATION AND SECURITY USING TAMPER-RESISTANT KEYS

(75) Inventor: Anthony C. Fascenda, North Bethesda, MD (US)

(73) Assignee: Koolspan, Inc., Bethesda, MD (US)

( * ) Notice: Subject to any disclaimer, the term of this patent is extended or adjusted under 35 U.S.C. 154(b) by 0 days.

(21) Appl. No.: 12/942,641

(22) Filed: Nov. 9, 2010

(65) Prior Publication Data

US 2011/0055574 A1    Mar. 3, 2011

Related U.S. Application Data

(63) Continuation of application No. 11/955,864, filed on Dec. 13, 2007, now Pat. No. 7,853,788.

(60) Provisional application No. 60/447,921, filed on Feb. 19, 2003, provisional application No. 60/422,474, filed on Oct. 31, 2002, provisional application No. 60/416,583, filed on Oct. 8, 2002.

(51) Int. Cl.
*H04L 29/06* (2006.01)
*H04L 9/32* (2006.01)
*H04K 1/00* (2006.01)

(52) U.S. Cl. ......... 713/172; 713/168; 713/171; 380/270

(58) Field of Classification Search .................. None
See application file for complete search history.

(56) References Cited

U.S. PATENT DOCUMENTS

| | | | |
|---|---|---|---|
| 5,473,689 A | 12/1995 | Eberhard | |
| 5,661,806 A | 8/1997 | Nevoux et al. | |
| 5,768,382 A | 6/1998 | Schneier et al. | |
| 6,026,165 A | 2/2000 | Marino et al. | |
| 6,304,658 B1 | 10/2001 | Kocher et al. | |
| 6,397,328 B1 | 5/2002 | Pitchenik et al. | |
| 6,526,264 B2 | 2/2003 | Sugar et al. | |
| 6,571,221 B1 | 5/2003 | Stewart et al. | |
| 6,591,364 B1 | 7/2003 | Patel | |
| 6,611,821 B2 | 8/2003 | Stahl et al. | |
| 6,625,591 B1 | 9/2003 | Vahalia et al. | |
| 6,643,781 B1 | 11/2003 | Merriam | |
| 6,657,981 B1 | 12/2003 | Lee et al. | |
| 6,980,660 B1 | 12/2005 | Hind et al. | |
| 7,024,690 B1 | 4/2006 | Young et al. | |

(Continued)

OTHER PUBLICATIONS

International Search Report dated Dec. 6, 2004 for Application No. PCT/US03/31930.

(Continued)

*Primary Examiner* — Shin-Hon Chen
(74) *Attorney, Agent, or Firm* — Hunton & Williams LLP

(57) ABSTRACT

The invention provides a secure Wi-Fi communications method and system. In an embodiment of the invention, unique physical keys, or tokens, are installed at an access point and each client device of the network. Each key comprises a unique serial number and a common network send cryptographic key and a common network receive cryptographic key used only during the authentication phase by all components on the LAN. Each client key further includes a secret cryptographic key unique to each client device. During authentication, two random numbers are generated per communications session and are known by both sides of the wireless channel. Only the random numbers are sent across the wireless channel and in each case these numbers are encrypted. A transposed cryptographic key is derived from the unique secret cryptographic key using the random numbers generated during authentication. Thus, both sides of the wireless channel know the transposed cryptographic key without it ever being transmitted between the two.

2 Claims, 14 Drawing Sheets

U.S. PATENT DOCUMENTS

| | | | |
|---|---|---|---|
| 7,028,186 B1 | 4/2006 | Stenman et al. | |
| 7,136,645 B2 | 11/2006 | Hanson et al. | |
| 7,373,508 B1* | 5/2008 | Meier et al. | 713/168 |
| 7,502,931 B2* | 3/2009 | Theimer | 713/171 |
| 2001/0023180 A1 | 9/2001 | Sauer | |
| 2001/0023446 A1 | 9/2001 | Balogh | |
| 2001/0048744 A1 | 12/2001 | Kimura | |
| 2001/0054147 A1 | 12/2001 | Richards | |
| 2002/0021665 A1 | 2/2002 | Bhagavath et al. | |
| 2002/0090089 A1 | 7/2002 | Branigan et al. | |
| 2002/0116338 A1 | 8/2002 | Gonthier et al. | |
| 2002/0129143 A1 | 9/2002 | McKinnon, III et al. | |
| 2002/0141385 A1 | 10/2002 | Wasik et al. | |
| 2002/0157090 A1 | 10/2002 | Anton, Jr. | |
| 2002/0169712 A1 | 11/2002 | Ginzboorg et al. | |
| 2002/0174235 A1 | 11/2002 | Likourezos | |
| 2003/0041244 A1 | 2/2003 | Buttyan et al. | |
| 2003/0050041 A1 | 3/2003 | Wu | |
| 2003/0051140 A1 | 3/2003 | Buddhikot et al. | |
| 2003/0061363 A1 | 3/2003 | Bahl et al. | |
| 2003/0070067 A1 | 4/2003 | Saito | |
| 2003/0093680 A1 | 5/2003 | Astley et al. | |
| 2003/0095663 A1 | 5/2003 | Hamilton et al. | |
| 2003/0097571 A1 | 5/2003 | Hamilton et al. | |
| 2003/0140256 A1 | 7/2003 | Hauenstein et al. | |
| 2003/0204443 A1 | 10/2003 | Knox | |
| 2003/0210788 A1* | 11/2003 | Billhartz et al. | 380/270 |
| 2003/0224756 A1* | 12/2003 | Kallio et al. | 455/411 |
| 2003/0235305 A1 | 12/2003 | Hsu | |
| 2004/0002923 A1 | 1/2004 | Ramaswamy et al. | |
| 2004/0023639 A1 | 2/2004 | Noel, Jr. | |
| 2004/0125781 A1 | 7/2004 | Walter et al. | |
| 2004/0153553 A1 | 8/2004 | Chotkowski et al. | |
| 2004/0176024 A1 | 9/2004 | Hsu et al. | |
| 2004/0192264 A1 | 9/2004 | Liu et al. | |
| 2004/0198220 A1 | 10/2004 | Whelan et al. | |
| 2004/0203590 A1 | 10/2004 | Shteyn | |
| 2004/0264699 A1 | 12/2004 | Meandzija et al. | |

OTHER PUBLICATIONS

Bruce Potter, "Wireless Security's Future," On the Horizon, IEEE 2003, pp. 68-72.

John Cox, "Vendors Offer Tools to Control, Secure WLANs," Network World, Jun. 7, 2004; 21, 23; ABI/INFORM Global, p. 24.

Miguel Bravo-Escos, "Networking Gets Personal," IEEE Review, Jan. 2002, pp. 32-36.

"Robust Header Compression (rohc)", retrieved from the Internet on Jul. 18, 2007, retrieved from the internet at http://www.ietff.org/html/rohc-charter.html, 5 pages.

V. Jacobson, "Compressing TCP/IP Headers for Low-Speed Serial Links", Network Working Group, retrieved from the internet on Jul. 18, 2007, retrieved from the internet at http://tools.ietf.org/rfc/rfc1144.txt, 48 pages.

D. Durham, et al., "The COPS (Common Open Policy Service) Protocol", Network Working Group, retrieved from the internet on Jul. 18, 2007, retrieved from the internet at http://www.rfc-editor.org/rfc/rfc2748.txt, 36 pages.

* cited by examiner

Authentication Request Frame sent to AP 922

| Authentication Algorithm Number | Authentication Transaction Seq. Number | Status Code | Challenge Text | CRC |
|---|---|---|---|---|
| "3" | "1" | 0 | Client key serial number, [R1] random number encrypted with CK_IDS$_2$ | |

FIG. 9B

Authentication Response Frame returned to Client 924

| Authentication Algorithm Number | Authentication Transaction Seq. Number | Status Code | Challenge Text | CRC |
|---|---|---|---|---|
| "3" | "2" | 0 | [R2] encrypted with CK_IDS$_2$ | |

Original Key

| 0 | 1 | 2 | 3 | 4 | 5 | 6 | 7 | 8 | 9 | A | B | C | D | E | F |
|---|---|---|---|---|---|---|---|---|---|---|---|---|---|---|---|
| 1 | * | 1 | 1 | * | 1 | 0 | * | 0 | 1 | 1 | 1 | 0 | 0 | 0 | 1 |

Transposed Key

| 0 | 1 | 2 | 3 | 4 | 5 | 6 | 7 | 8 | 9 | A | B | C | D | E | F |
|---|---|---|---|---|---|---|---|---|---|---|---|---|---|---|---|
| 0 | 0 | 1 | 1 |   |   |   |   |   |   |   |   |   |   |   |   |

FIG. 12E

Original Key

| 0 | 1 | 2 | 3 | 4 | 5 | 6 | 7 | 8 | 9 | A | B | C | D | E | F |
|---|---|---|---|---|---|---|---|---|---|---|---|---|---|---|---|
| 1 | 0 | 1 | 1 | 0 | 1 | 1 | 1 | 0 | 1 | 0 | 1 | 1 | 0 | 0 | 1 |

Final result
HEX = B571

Transposed Key

| 0 | 1 | 2 | 3 | 4 | 5 | 6 | 7 | 8 | 9 | A | B | C | D | E | F |
|---|---|---|---|---|---|---|---|---|---|---|---|---|---|---|---|
| 0 | 0 | 1 | 1 | 0 | 1 | 1 | 0 | 1 | 1 | 0 | 1 | 1 | 0 | 0 | 1 |

HEX = 36D9

LOCALIZED NETWORK AUTHENTICATION AND SECURITY USING TAMPER-RESISTANT KEYS

CROSS-REFERENCE TO RELATED APPLICATIONS

The present application is a continuation of U.S. application Ser. No. 11/955,864, filed Dec. 13, 2007, which is a continuation of U.S. application Ser. No. 10/679,371, filed Oct. 7, 2003, which claims priority to U.S. Provisional Patent Application No. 60/416,583 filed on Oct. 8, 2002; U.S. Provisional Patent Application No. 60/422,474 filed Oct. 31, 2002; and U.S. Provisional Patent Application No. 60/447,921 filed Feb. 19, 2003. The disclosures of which are incorporated herein by reference in their entireties. The present application is related to U.S. patent application Ser. No. 10/679,472, entitled "Self-Managed Network Access Using Localized Access Management" filed Oct. 7, 2003 and U.S. patent application Ser. No. 10/679,268, entitled "Shared Network Access Using Different Access Keys" filed Oct. 7, 2003.

BACKGROUND OF THE INVENTION

1. Field of Invention

The present invention relates to wireless networking, and more particularly, to an authentication and secure communication system for a Wi-Fi (IEEE 802.11) network.

2. Description of Related Art

A Wireless Local Area Network (WLAN) is generally implemented to provide local connectivity between a wired network and a mobile computing device. In a typical wireless network, all of the computing devices within the network broadcast their information to one another using radio frequency (RF) communications. WLANs are based on the Institute of Electrical and Electronic Engineers (WEE) 802.11 standard, which designates a wireless-Ethernet specification using a variety of modulation techniques at frequencies generally in the 2.4 gigahertz (GHz) and 5 GHz license-free frequency bands.

The IEEE 802.11 standard ("Wi-Fi"), the disclosure of which is incorporated herein in its entirety by reference, enables wireless communications with throughput rates up to 54 Mbps. Wi-Fi (for "wireless fidelity") is essentially a seal of approval certifying that a manufacturer's product is compliant with IEEE 802.11. For example, equipment carrying the "Wi-Fi" logo is certified to be interoperable with other Wi-Fi certified equipment. There are Wi-Fi compatible PC cards that operate in peer-to-peer mode, but Wi-Fi usually incorporates at least one access point, or edge device. Most access points have an integrated Ethernet controller to connect to an existing wired-Ethernet network. A Wi-Fi wireless transceiver connects users via the access point to the rest of the LAN. The majority of Wi-Fi wireless transceivers available are in Personal Computer Memory Card International Association (PCMCIA) card form, particularly for laptop, palmtop, and other portable computers, however Wi-Fi transceivers can be implemented through an Industry Standard Architecture (ISA) slot or Peripheral Component Interconnect (PCI) slot in a desktop computer, a Universal Serial Bus (USB), or can be fully integrated within a handheld device.

FIG. 1 illustrates a typical conventional Wi-Fi network 100. Particularly, Wi-Fi network 100 comprises a number (N) of computing devices 110A-N and an access point 120. Each computing device 110 comprises a Wi-Fi transceiver (not shown) such as a Wi-Fi enabled network interface card (NIC) to communicate with the access point via an RF communications link 115. The access point 120 comprises a Wi-Fi transceiver (not shown) to communicate with a wired network via an RF communications link 125.

Authentication and security features offered by Wi-Fi products to date have been implemented via Wired Equivalency Protocol (WEP). With WEP enabled, an access point will not admit anyone onto the LAN without the proper WEP settings. The WEP settings are used primarily for wireless security, but they also form the basis for authentication in that without these settings known to and used by the user, the user cannot connect through the access point. WEP comes in 40-bit or 128-bit forms. The 40-bit version is actually a 40-bit key plus a 24 bit Initialization Vector ("IV"), whereas the 128-bit version is really a 104-bit plus the 24-bit IV. WEP utilizes a RC4 stream cipher. This stream cipher works by using the WEP key and the IV to seed a pseudo-random number generator ("PRNG"), which generates a keystream equal in length to the text it is encrypting plus the IV. The text and keystream are XOR'd together to produce the encrypted data. Prepended to the encrypted data is the IV so that the receiving side can seed its PRNG to XOR the encrypted text with the same keystream to recover the original text.

Unfortunately, the mere presence of the plain text IV prepended to the encrypted text enables one to easily attack WEP. In a WEP attack, since the IV is known, i.e., transmitted as plain text, and the first byte of the encrypted text is known, the first byte of the keystream can be immediately derived. Since a standard WEP key has a first byte that is constrained to values between three (3) and seven (7), and the second byte must be 0xFF, all that is necessary is a large sample of data to quickly, e.g., less than 15 minutes, recover the original key. Since the IV is only 24-bits, there can only be approximately 17 million distinct values. In a typical system, the IV repeats often over a twenty-four (24) hour period. Exploiting this repetition and the weak IVs makes it very easy to crack WEP.

To counter this problem, a number of solutions have emerged that attempt to fix the problem by developing external fixes to the issues of authentication and security. The typical fix involves a "VPN-like" solution. The solution takes the form of software added to the client-side that encrypts/decrypts data outside of the Wi-Fi card, typically on the user's PC. On the network side of the access point, a server performs the similar function of encryption/decryption. A secure tunnel is formed between the client and the server using the access point only as a conduit between the two ends. Unfortunately, this does not prevent unauthorized users from associating with or using the LAN as the WEP keys can still be easily compromised.

To solve the above problem, others have developed network appliances that force all access points to be directly connected to an appliance box, which is typically a rack-mounted box that performs a specific bunch of functions on the network. For example, an appliance box is a router or an Ethernet switch, or a web-server or virtual private network (VPN) gateway box. Boxes like BlueSocket's WG-1000 Wireless Gateway™ provide a separate authentication/security server that segregates wireless traffic from the rest of the network. In a sense, a separate LAN is provided, to which all of the access points must connect and then their traffic is directed into their gateway before it is allowed to go onto the LAN.

Of particular interest is the Port Based Network Access Control WEE 802.1x solution, which is being adopted by numerous parties and has built-in support in Windows XP™. WEE 802.1x is a LAN-based specification that has been modified for use in wireless networks. Particularly, a separate authentication server is used to authenticate users who attempt to connect onto the LAN. When a user, i.e., client, first associates with the access point, the access point forwards the authentication request to the authentication server, which in turn then communicates back through the access point to the client. This back-and-forth process using the access point as a proxy continues until an authentication algorithm is mutually agreed and a successful authentication takes place. 802.1x unfortunately does not specify the authentication method nor does it provide any 'hand-off' of information between two access points. Thus, in actual practice two fully-compliant 802.1x-enabled access points may not handle a user the same way on the same network. To use 802.1x technology, legacy access points are generally replaced with new units that support 802.1x.

There are many others that are developing complementary solutions for Wi-Fi networks. Most, however, offer complex solutions geared towards large-scale networks with 200 or more users. These systems are vendor-specific, expensive, complex to install, require ongoing IT support and maintenance, and may not work with legacy Wi-Fi equipment.

SUMMARY OF THE INVENTION

The present invention overcomes these and other deficiencies of the related art by providing a secure Wi-Fi communications method and system employing a combination of physical keys, or tokens, that attach to existing computing devices and wireless access points. These keys are typically connected via a USB port, although other types of connections, e.g., Ethernet, PC-Card, serial, parallel, and the like may be employed.

The heart of the present invention is a three-factor authentication process. First, each component of the Wi-Fi network employs a physical key. For example, a client key is used to enable wireless connections on a user's computing device. An access point key ("AP key") is used to activate at the access point the secure Wi-Fi functions described herein. Moreover, a master key is provided to enable and administer secure authentication and communications on the network. Each key comprises a serial number, which is forever unique, and must be unlocked using a personal identification number (PIN) known only to the owner, i.e., user, of the key. This PIN can be changed by the owner at any time.

Second, each physical key comprises a common network send ("NKS") and a common network receive ("NKR") cryptographic key used only during the authentication phase by all components on the LAN. Each physical key further includes a unique secret cryptographic key used in the second step of the authentication process. There is no mathematical relationship between key serial numbers and either the network send or network receive cryptographic keys, and the unique secret cryptographic key. The authentication process results in two random numbers that are known by both sides of the wireless channel and are uniquely generated per communications session. For example, when a client connects to an access point, the authentication process results in two unique random numbers being generated (one on each side of the connection). Only the random numbers are sent across the wireless channel and in each case these numbers are encrypted.

Third, a transposed cryptographic key is used to encrypt all communications across the wireless channel between client and access point on behalf of the user. The transposed cryptographic key is preferably a 32-byte (256-bit) key generated using the random numbers generated during authentication and the client's secret cryptographic key. Using the serial number of the client's physical key, the access point knows the client's secret cryptographic key. Thus, both sides of the wireless channel know the secret key without it ever being transmitted between the two. The two random numbers are used to scramble the secret cryptographic key to generate a transposed version, which is finally used by both sides for secure data transmission after authentication.

An advantage of the invention is that both an authentication and security solution is implemented in the access point itself and no additional network appliances or server software are required. Another advantage of the invention is that it can be retro-fitted via software upgrades to existing access points.

Another advantage of the invention is that the secure communications and authentication steps are difficult to hack by an interloper. Particularly, because the use of network send and receive cryptographic keys is very minimal, only two packets per session and per user are ever encrypted with these keys. By contrast, the same cryptographic key is used on every packet for every user in normal Wi-Fi operation implementing WEP. Further, the WEP security algorithm must broadcast a 24-bit Initialization Vector (IV) to seed the decryption process. The IV contains many weak keys, which leads to very rapid hacking of WEP encryption transmissions regardless of key length. The present invention uses no such Initialization Vector.

Another advantage of the invention is that it allows unique identification of each user, provides positive authentication without the use of back-end servers, and enables transparent roaming. Moreover, the present bi-directional authentication process is not just for identifying the user to the network, but also for the user to make sure that she/he is connecting to the desired network and not just a network that 'looks like' the network to which he's trying to connect.

Another advantage of the invention is its implementation of physical keys, thereby pre-storing secret cryptographic keys in both the client and access point, reduces the prior time and costs to deploy secured Wi-Fi networks, and simplifies network operations. Moreover, the use of physical keys allows the storage of network keys for multiple networks allowing a user the luxury of using a single consistent authentication device for any network to which that user has permission. The physical keys also provide a platform independent of the computing devices on which other applications can be developed that work in conjunction with the similar keys on the AP devices of other networks.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the following descriptions taken in connection with the accompanying drawings in which:

FIGS. 9B-C illustrate an exemplary format of the authentication frames exchanged in the embodiment of FIG. 9A;

FIG. 12A-E illustrate an example 16-bit key scrambling process for deriving an encryption/decryption key according to an embodiment of the invention.

DETAILED DESCRIPTION OF THE PREFERRED EMBODIMENTS

Figure 1:
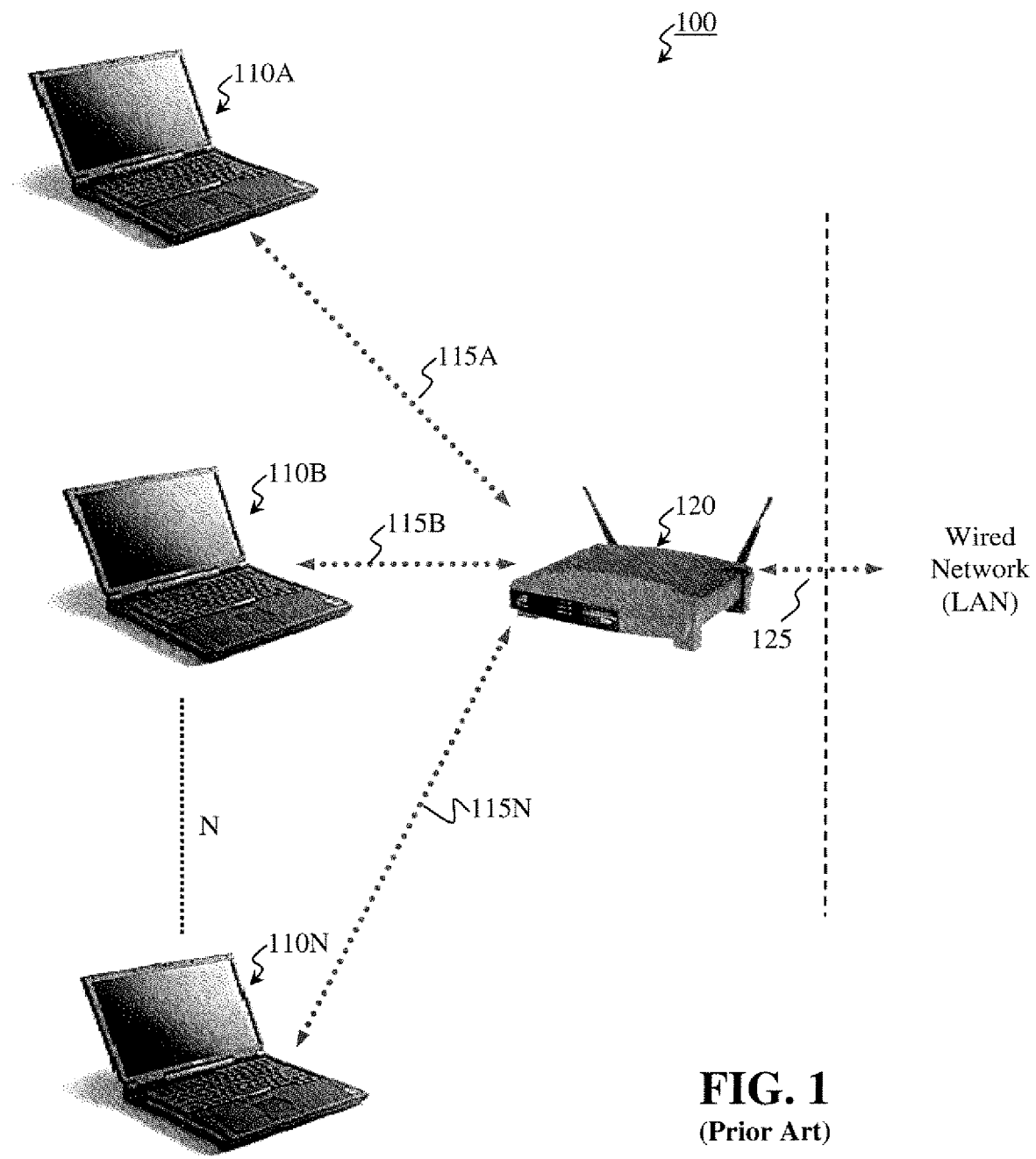
FIG. 1 illustrates a conventional Wi-Fi network.

Preferred embodiments of the present invention and their advantages may be understood by referring to FIGS. 2-12, wherein like reference numerals refer to like elements, and are described in the context of a Wi-Fi network. Nevertheless, the present invention is applicable to both wired or wireless communication networks in general. For example, the present invention enables secure end-to-end access between a client and any computer residing on a network backbone. Often there may not be a wireless component anywhere in such a situation.

The present invention enhances and safeguards Wi-Fi networks by implementing a secure, local, edge method and system (the implementation of which is herein referred to as communicating in a "secure" mode) employing a combination of software routines and physical keys in the form of easy-to-use adapters that attach to existing computing devices and wireless access points via an available USB port. These physical keys are secure, tamper-resistant physical tokens. "Edge" refers to authentication of client devices taking place at the edge or outer boundary of the network, i.e., at the access point, rather than centralized inside the network using a server. As the following will describe in enabling detail, client computing devices are authenticated and data security is provided across wireless links using secret cryptographic keys, which are pre-stored in the physical keys installed at both the client's computing device and the access point. According to an embodiment of the invention, special access point software ("AP software") is provided in the wireless access points and NIC drivers are provided in the client devices to realize the functions described herein and to ensure delivery of standard Wi-Fi functionality as well as compatibility with all Wi-Fi certified products currently installed on a Wi-Fi network.

Figure 2:
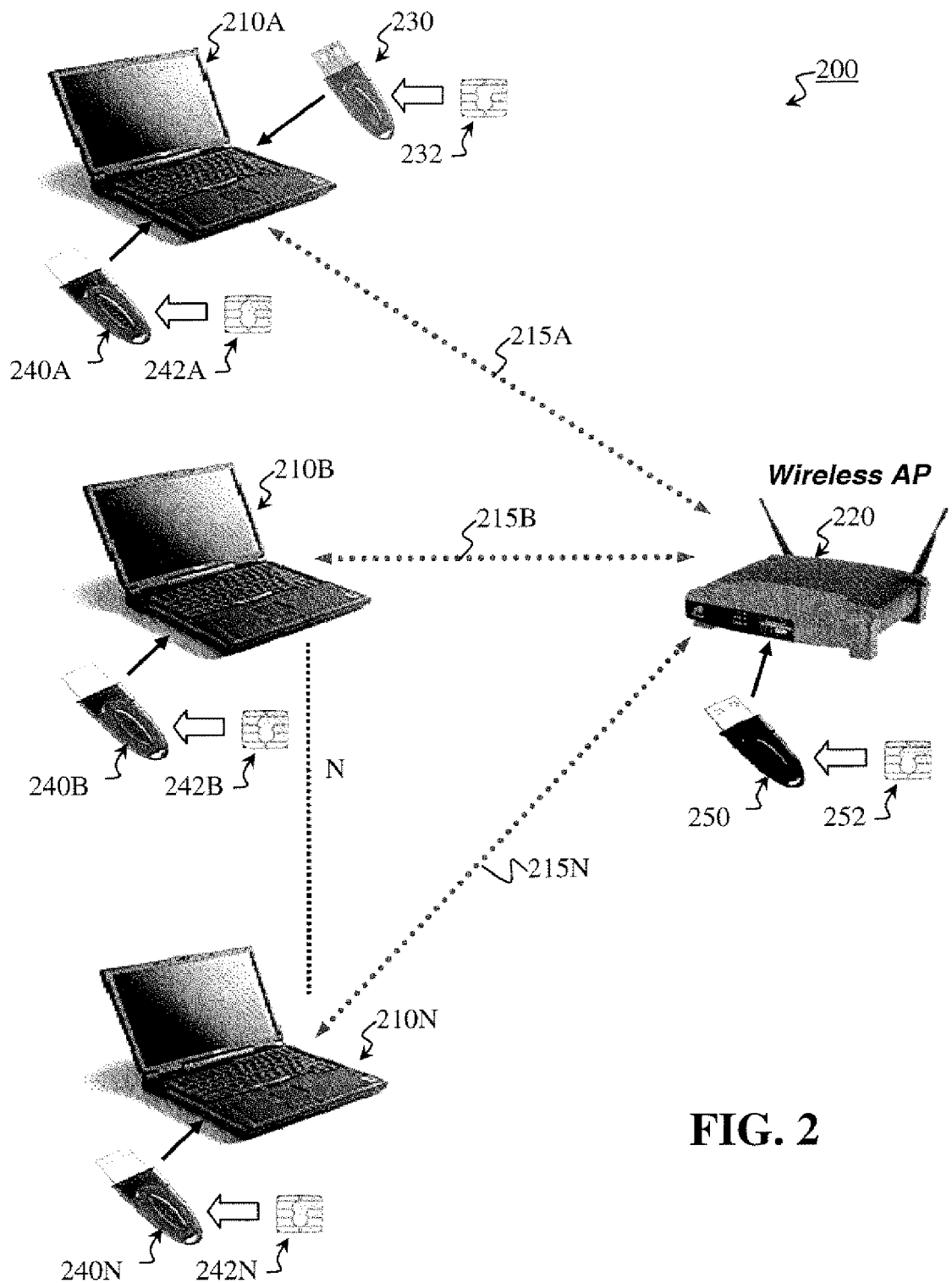
FIG. 2 illustrates a secure Wi-Fi communication system according to an embodiment of the invention.

FIG. 2 illustrates a secure Wi-Fi network 200 according to an embodiment of the invention. Wi-Fi network 200 comprises a number N of computing devices 210A-N communicating with one another via a wireless access point 220. The access point 220 comprises a Wi-Fi transceiver (not shown) to communicate with a wired network (not shown). Although each computing device 210 is shown as a laptop, other Wi-Fi enabled computing devices such as, but not limited to personal digital assistants (PDAs), desktops, and workstations can be employed within network 200. Moreover, one of ordinary skill in the art recognizes that more than one wireless access point 220 may be implemented within network 200. All computing devices 210A-N can act as clients of network 200. However, at least one computing device such as computing device 210A is reserved as a host computer for administering the inventive features through residing administrative software (not shown) when necessary. In an alternative embodiment, the host computer can be another machine on the wired-side of the network. A master key 230 is installed into an available USB port (not shown) at host computing device 210A during administration and management of the network 200. To facilitate authentication and secure communications, a unique client key 240A-N is installed into an available USB port (not shown) at each computing device 210A-N. Likewise, an access point key ("AP key") 250 is installed into an available USB port (not shown) at access point 220.

It is important to note that the physical keys described herein are implemented via USB ports. One of ordinary skill in the art recognizes that the master key 230, client keys 240A-N, and AP key 250 can be alternatively implemented by other conventional or foreseeable connection configurations such as, but not limited to PC cards installed via a PCI or ISA slot; a physical token connected via a serial, parallel, or other preferred type of port; an Ethernet card; or a wireless smart card. In yet another implementation, the AP key 250 can be incorporated directly into the internal hardware of the access point 220, thereby alleviating the need for an external physical AP key.

The master key 230, client keys 240A-N, and AP key 250 overlap in functionality. Particularly, each physical key comprises an embedded tamper-resistant subscriber identity module (SIM) token 232, 242A-N, or 252, respectively, unique to each key. In an embodiment of the invention, a Cryptoflex USB-enabled SIM chip is employed as the SIM token. Nevertheless, other conventional or foreseeable SIMs may be substituted. The AP key 250 differs slightly from both the master key 230 and the client keys 240A-N in that it preferably employs a device USB connector rather than a standard USB connector. Generally, a device USB connector is different from a standard USB connector only in physical layout. Yet, they each carry the same signal wires to provide a USB interface to the USB-enabled SIM chip, which typically communicates over a simplex data line at approximately 9600 bits-per-second. Importantly, each physical key has a unique serial number stored permanently and electronically inside the SIM by the manufacturer to provide positive identification. Each SIM comprises a random number generator.

Each client key 240 is used to authenticate and provide secure connections at a corresponding computing device 210. Once the special NIC driver software is installed for a NIC, the computing device 210 examines whether a Wi-Fi network exists and if found, attempts to associate with that network. If the network is enabled to operate in secure mode, all of the currently configured wireless settings of the computing device 210 are switched to secure mode and the login process is completely automated as further described. If the network is not secure mode enabled, the computing device 210 attempts to connect to it using standard Wi-Fi parameters. The smart NIC driver replaces a standard driver associated via a standard wireless NIC card, thereby providing the software necessary to manage communications with the client key 240. This driver authenticates data packets and performs encryption/decryption functions during secure mode communications.

Like the master key 230, the AP key 250 is first initialized so that it can be recognized by the administrative software and by the AP software as an AP key. The AP key 250 is used to activate functionality in access point 220. In an embodiment of the invention, the access point 220 does not function without the AP key 250 installed. Removal of the AP key 250 causes all associated network connections to be immediately broken and further wireless access through the access point 220 is not possible until the AP key 250 is reinserted. In an alternative embodiment, the access point 220 defaults to standard mode if the AP key 250 is not inserted. If the AP key 250 is inserted, for instance, the access point 220 facilitates the secure mode for properly enabled users, but also provides limited standard Wi-Fi communications for users not properly enabled to use the secure mode. If more than one access point is present within the network, each access point has its own unique AP key.

The master key 230, while identical in physical design to the client keys 240A-N and the AP key 250, performs additional functionality. Particularly, the master key 230 is used by an administrator to manage a key database (not shown), which will be described in detail below, and the set of client keys 240A-N and AP key 250. The master key 230 is required to operate the administrative software and is used to initialize all client and AP keys. As described below, the master key 230 is initialized after receipt from the manufacturer to identify itself electronically to the administrative software as a master key. Preferably, there is one master key 230 per network 200, although duplicate master keys can be cloned for backup. When installed into a host computer running the administrative software, the master key 230 enables either the creation of or unlocking of the key database. As an optional extra security measure, the master key 230 must be unlocked with an appropriate PIN stored inside the key to become active. If the master key 230 is lost, access to this database and hence maintenance of the network 200 is irretrievably lost.

Figure 3:
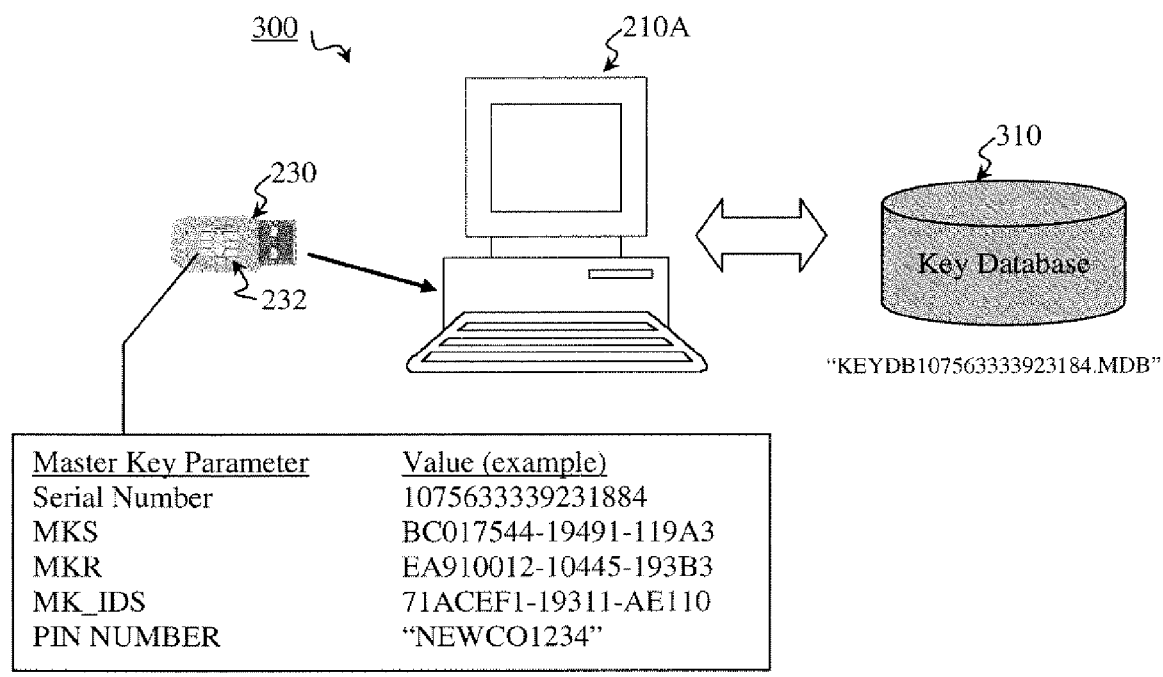
FIG. 3 illustrates a key management system according to an embodiment of the invention.

FIG. 3 illustrates a key management system 300 according to an embodiment of the invention. Particularly, the key management system 300 comprises the host computing device 210A, the master key 230, and a key database 310. The master key 230 comprises a serial number, a master key network cryptographic send key ("MKS"), a master key network cryptographic receive key ("MKR"), a master key cryptographic secret key ("MK_IDS"), and a PIN number. As will be described, MKS, MKR, and MK_IDS, example values of which are presented in hexadecimal form in the figure, are created upon initialization of the master key. MK_IDS has no mathematical relationship to the master key serial number. Use of the cryptographic keys will be described in further detail below. As previously mentioned, the PIN number is used to unlock the master key 230, i.e., to access the data stored on SIM 232, and hence to access the key database 310. The key database 310, which is securely stored within a memory device of host computer 210A, comprises individual records of every client key 240A-N and AP key 250 initialized for use within network 200. Each individual client key record comprises a serial number of the corresponding client key and information such as name of person or computing device that the client key belongs to, location, company department, and any other administrative fields deemed necessary. Each individual client key record is stored in encrypted form using the MK_IDS. Key database 310 is referenced by the serial number of the corresponding master key 310 and further comprises the identification of all active AP keys 250 on the network 200 and any pertinent administrative information.

All encryption/decryption tasks described herein are preferably performed using an Advanced Encryption Standard (AES) algorithm, the implementation of which is apparent to one of ordinary skill in the art. Nonetheless, alternative cryptographic algorithms may be employed, the identification and implementation of which are also apparent to one of ordinary skill in the art.

Figure 4:
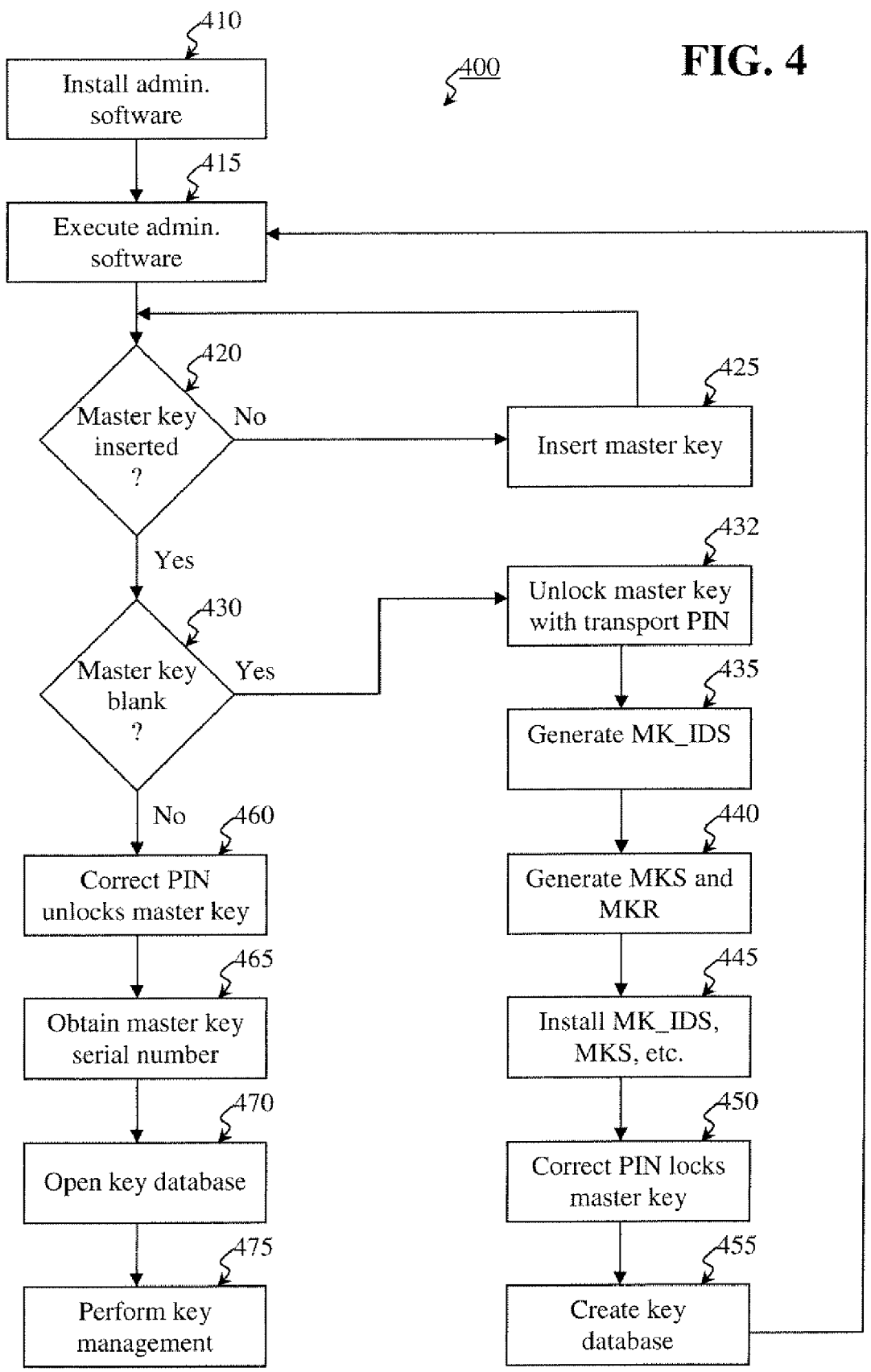
FIG. 4 illustrates a master key management process according to an embodiment of the invention.

FIG. 4 illustrates a master key management process 400 according to an embodiment of the invention for initializing the master key 230 and administering the key database 310. The administrative software is first installed (step 410) onto host computing device 210A from a CD-ROM or other suitable storage medium. Upon execution (step 415), the administrative software determines (step 420) whether a master key 230 is inserted into an available USB port. If no master key 230 is present, the administrator is directed to insert (step 425) a master key. Once a master key 230 is inserted, it is analyzed to determine (step 430) whether the master key 230 has been previously and properly initialized, or is currently blank, i.e., MKS, MKR, and MK_IDS have not been created and stored within SIM 232. If the master key 230 is blank, it is first unlocked (step 432) with entry of a correct transport PIN or code. For example, a new master key 230 may be delivered with a transport code that an administrator must correctly enter to gain access to the SIM 232. After unlocking the master key 230, the administrator may replace the transport code with a secret code or PIN selected by the administrator for securing the card. Thus, nobody else can utilize the master key 230 without knowing the secret code.

The administrative software creates (step 435) a MK_IDS using a random number generator within the SIM 232. MK_IDS has no mathematical relationship to the master key serial number. Secret network cryptographic keys MKS and MKR, which are respectively the send and receive network cryptographic keys common to all users on the network, are then generated (step 440). For example, the administrative software instructs the SIM 232 to generate three random numbers that become the MKS, MKR, and MK_IDS. MK_IDS, MKS, and MKR, in addition to any administrative information, are then installed (step 445) into SIM 232 of the master key 230. In an embodiment of the invention, MKS, MKR, and MK_IDS are 256-bit random numbers generated by SIM 232. The administrator is requested (step 450) to enter a correct PIN to lock the master key 230, thereby completing initialization. The administrator is now allowed to create (step 455) a new key database 310 and have it associated with the master key 230 through the master key serial number.

If the master key 230 inserted is not blank, i.e., it has already been properly initialized for either the current network 200 or another secure mode enabled network, the administrator is requested (step 460) to enter the correct PIN to unlock the master key 230 and gain access to the key database 310. Upon the entry of a correct PIN, the serial number from the master key is retrieved (step 465) to identify and open (step 470) the appropriate key database 310 stored on host computer 210A. Individual client records within the key database 310 are decrypted with MK_IDS as necessary and key management (step 475), i.e., management of client keys 240A-N and/or AP key 250, is enabled.

In an embodiment of the invention, removal of the master key 230 while the administrative software executes automatically closes the key database 310, thereby rendering the client records not viewable, and disabling all administrative and key management functions. Later insertion of a master key with the administrative software still executing again enables the administrative and key management functions. If execution of the administrative software terminates with the master key 230 inserted, the key database 310 is automatically and securely closed.

Figure 5:
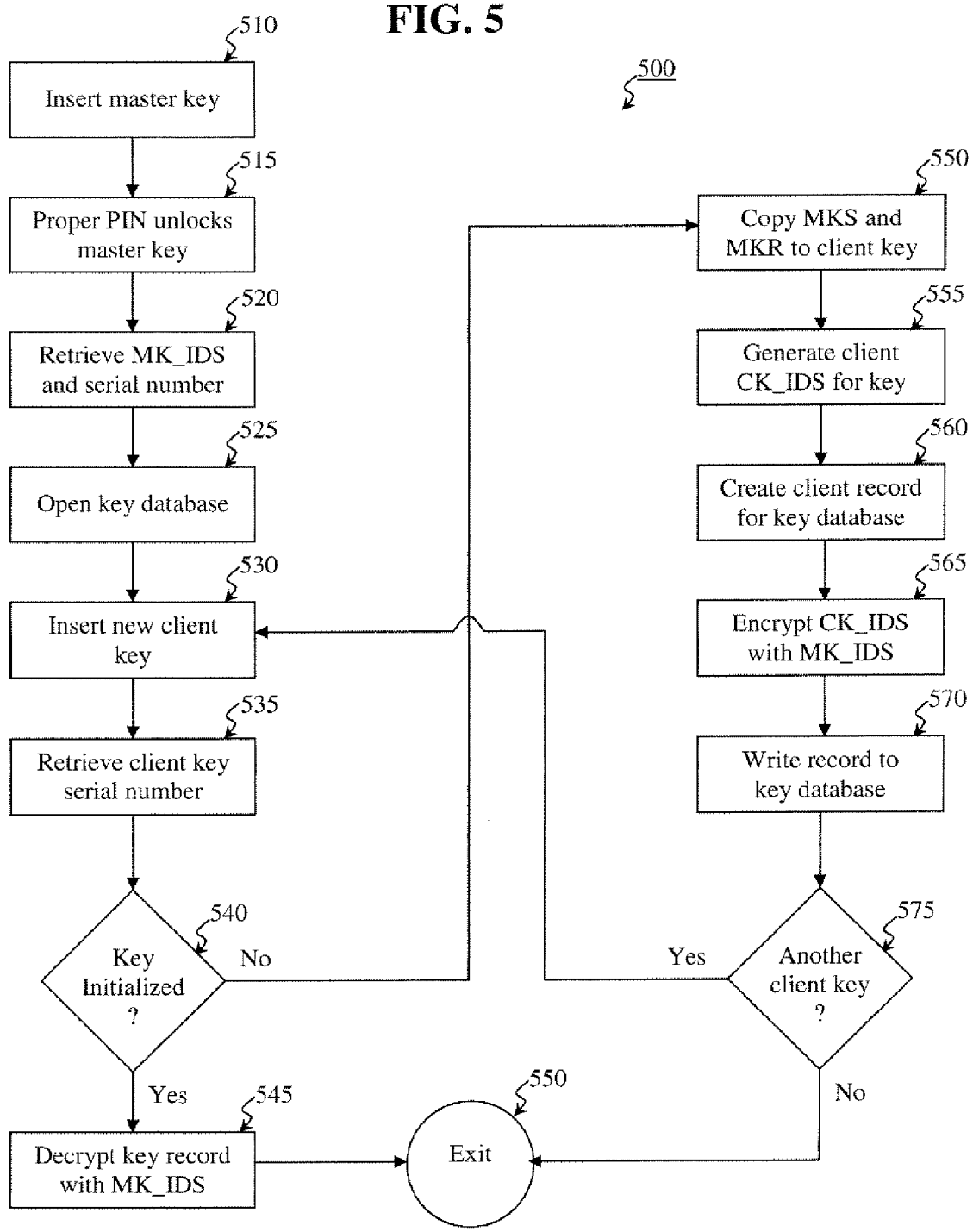
FIG. 5 illustrates a process for generating a key database according to an embodiment of the invention.

FIG. 5 illustrates a process 500 for generating a key database 310 according to an embodiment of the invention. Host computing device 210A must have a minimum of two free USB ports, one for the master key 230 and one for each sequential client key 240 added to the key database 310. A properly initialized master key 230 is first inserted (step 510) into host computing device 210A. To gain access to the data stored within the master key 230, and hence the key database 310 on host computer 210A, a correct PIN associated with the master key 230 must be entered (step 515) by an administrator to activate the key. The administrative software then retrieves (step 520) MK_IDS and the master key serial number. The master key serial number is used to identify and open (step 525) the corresponding key database 310. A client key 240 is inserted (step 530) into the host computer 210A and the administrative software retrieves (step 535) the serial number associated with that client key. The administrative software determines (step 540) if the client key 240 has been previously initialized by identifying whether a corresponding client record exists within the key database 310. If so, the administrative software allows the administrator to view the administrative information associated with the client key 240 by decrypting (step 545) the corresponding key record with MK_IDS. If the client key 240 has not been initialized, cryptographic keys MKS and MKR stored within the master key 230 are copied (step 550) to SIM 242. MKS and MKR become the client's cryptographic network send (NKS) and receive (NKR) keys respectively, i.e., MKS is identical to NKS and MKR is identical to NKR. A client key cryptographic secret key ("CK_IDS") is then generated (step 555) having no mathematical relationship to the client key serial number. For example, SIM 232 is instructed to generate a new 256-bit random number for each new client key 240. A simple SIM command will cause the SIM 232 to generate the number that can be read from the SIM 232 into the host computer 210A and then transferred to the client key 240. A client key record is created (step 560) comprising administrative information pertaining to the user or computing device associated with the client key 240, the serial number of the client key 240, and CK_IDS encrypted (step 565) with MK_IDS. This client key record is then stored (step 570) in the key database 310. The administrator then has the option of initializing another client key (step 575), wherein steps 530-570 are repeated for each additional client key 240.

Figure 6:
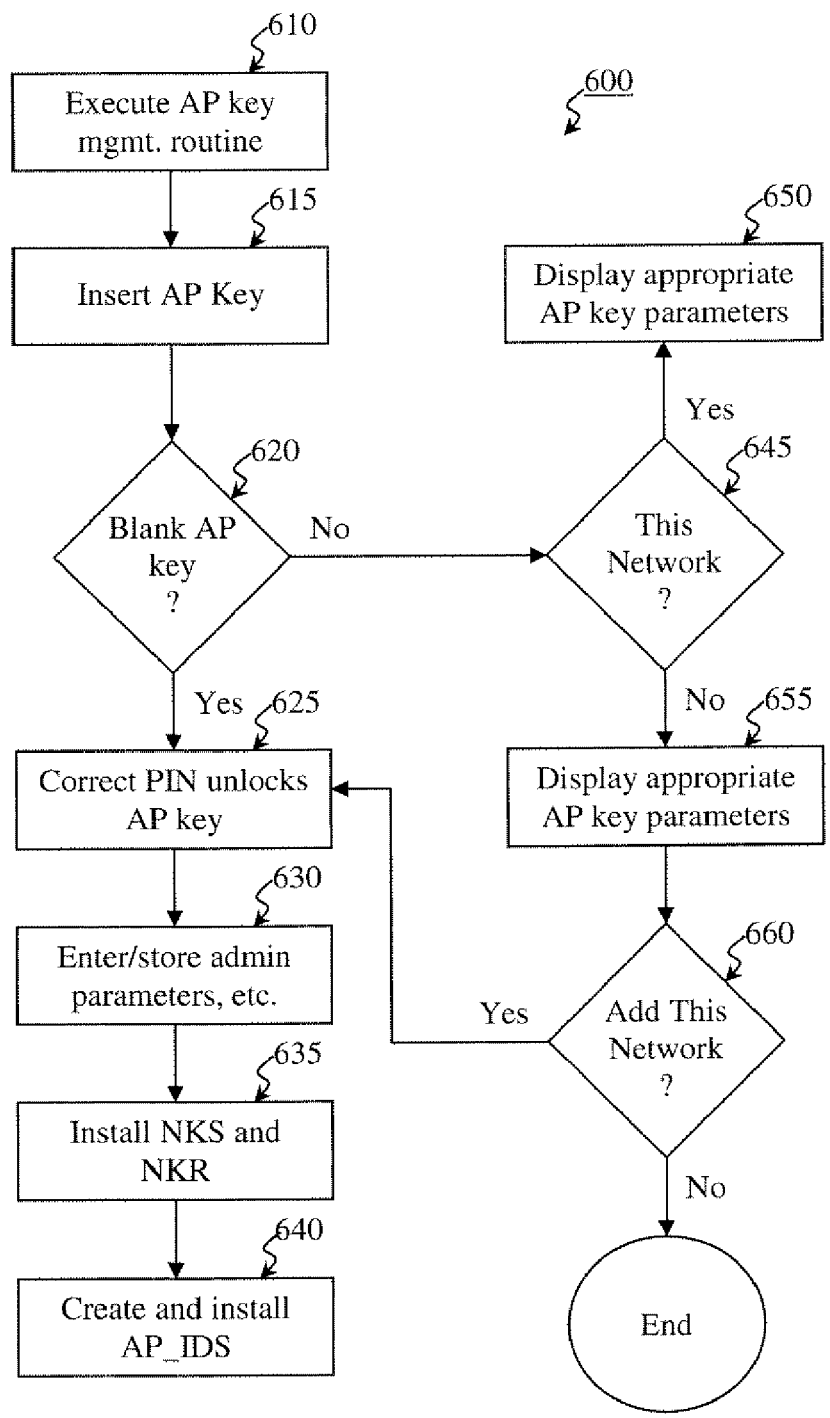
FIG. 6 illustrates a process for managing an access point key according to an embodiment of the invention.

Key management of the AP key 250 is performed according to the process 600 illustrated in FIG. 6. Host computing device 210A must have a minimum of two free USB ports, one for the master key 230 and one for the AP key 250. Upon execution (step 610) of an appropriate AP key management subroutine within the administrative software, the administrator is requested (step 615) to insert an AP key 250 into an available USB port. Upon insertion of an AP key, the subroutine checks (step 620) whether the inserted AP key is blank, i.e., not initialized, or is an existing key belonging to network 200 or another secure mode enabled Wi-Fi network. If the AP key 250 is blank, the administrator is required (step 625) to enter a correct PIN to unlock the key. Of course, failure to enter the correct PLN in a certain number of attempts may optionally disable key management functions for a set period of time. Once unlocked, the administrator enters (step 630) the desired administration parameters appropriate to the access point 220 such as network identification, location, access point identification, etc. This information is stored within key database 310 and SIM 252 of the AP key 250. NKS and NKR are then installed (step 635) into SIM 252 by copying the values of MKR and MKS respectively. An access point cryptographic secret key ("AP_IDS") is then created (step 640) from a random 256-bit number generated by SIM 232 and installed in the AP key 250. AP_IDS is encrypted with the MK_IDS and subsequently stored with the AP serial number as an access point record in the key database 310.

It is important to note that the NKS of the AP key 250 must match the NKR of the client keys 240A-N. Likewise, the NKR of the AP key 250 must match the NKS of the client keys 240A-N. Thus, when the master key 230 is used to initialize an AP key 250, the MKS is written into the AP key 250 as its NKR. The MKR is written into the AP key 250 as the NKS. In other words, MKS and MKR are flipped in the AP key 250. Moreover, when the master key is used to initialize a client key 240, the MKS is written into the client key 240 as NKS (not flipped) and the MKR is written as the NKR. When the AP key 250 and client keys 240A-N are used communicate, the AP's NKR key is identical to the client's NKS key and the AP's NKS key is identical to the client's NKR key. Thus, a matched pair of cryptographic keys exists between each pair of endpoints. In an alternative embodiment of the invention, NKS and NKR of the client key 240 is flipped with respect to MKS and MKR, and NKS and NKR of the AP key 250 is not.

If the AP key 250 has been previously initialized, it is determined (step 645) whether the inserted AP key is associated with the current network 200 or another Wi-Fi network. If AP key 250 is associated with the current network 200 then the parameters of the key excluding any cryptography keys, which are maintained in secret, may be displayed (step 650). For security protection, an administrator can never view or modify any of the cryptographic keys in either the master key 230, client keys 240A-N, or AP key 250. If the inserted AP key is associated with another network, the appropriate parameters of the key may be displayed (step 655). In an embodiment of the invention, one AP key 250 may be associated with a plurality of different secure mode enabled Wi-Fi networks. For example, if the AP key 250 is determined to be associated with another network, the administrator is queried (step 660) as to whether it is desired to have the AP key 250 associated with the present network 200. If so, then the administrator is requested (step 625) to enter a correct PIN to unlock the AP key. Once unlocked, steps 630-640 are repeated for that AP key.

Figure 7:
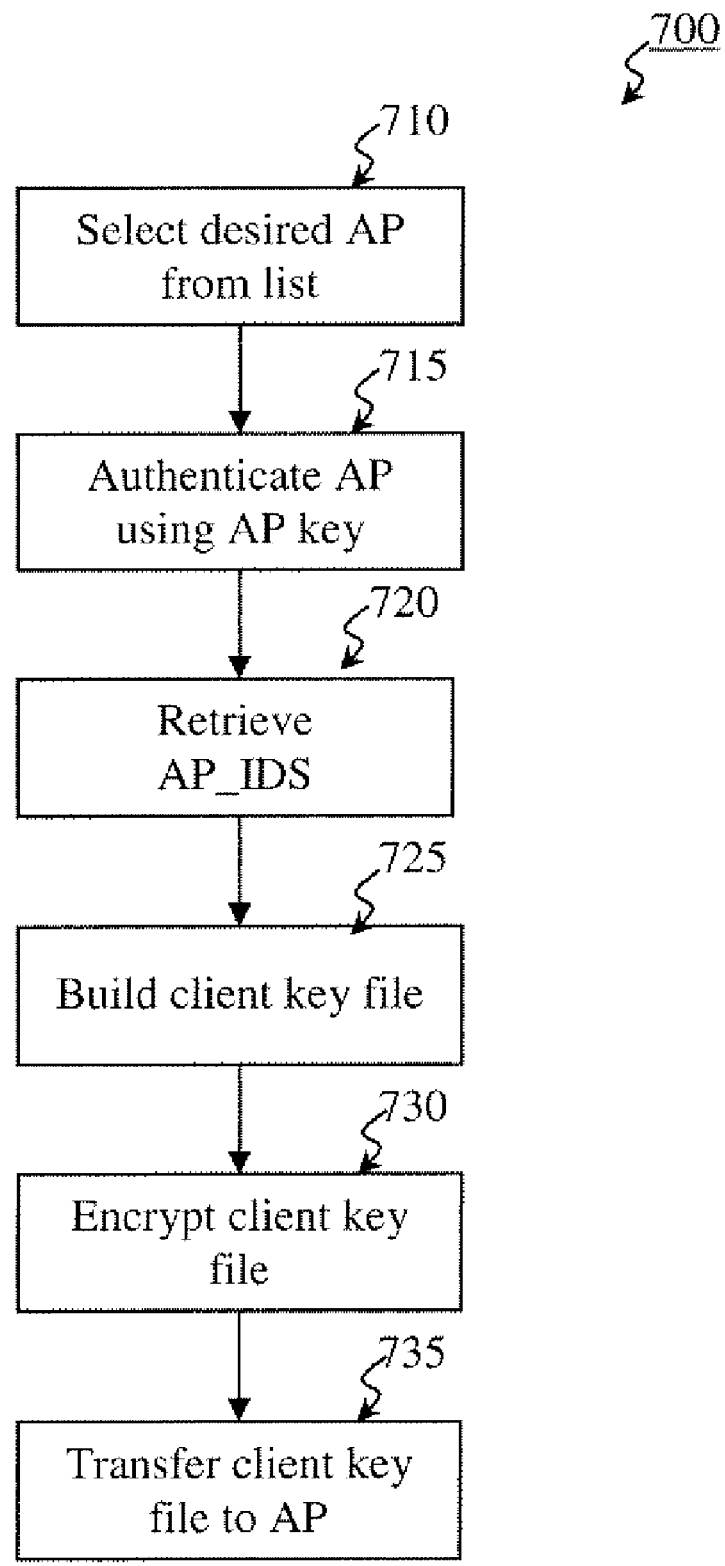
FIG. 7 illustrates a process for uploading a client key database file to an access point according to an embodiment of the invention.

FIG. 7 illustrates a process 700 implemented by the administrative software to upload a client key database file to an access point 220 according to an embodiment of the invention. Particularly, only information from the client records of key database 310 are uploaded to the access point 220. Process 700 requires that master key 230 is installed into host computer 210A and AP key 250 is installed into access point 220. Particularly, an administrator selects (step 710) via the administrative software an access point displayed from a list of all access points employed on the network 200. The selected access point, e.g., access point 220, is then authenticated (step 715) by implementing the authentication process described in the following paragraphs. Using the serial number of the access point 220, the AP_IDS is retrieved (step 720) from the key database 310. Importantly, the AP key 250 for that network has only one AP_IDS, which is stored in SIM 252 and also in the key database 310. A client key database file comprising the serial numbers and CK_IDS of all registered client keys 240A-N is built (step 725). No information pertaining to the AP key 250 is included in the client key database file, i.e., transferred between the access point 220 and the host computer 210A. The client key database file is encrypted (step 730) using AP_IDS stored within the key database 310 and then transferred (step 735) to the access point 220 where it is decrypted using the AP_IDS stored within SIM 252. In an embodiment of the invention, the access point 220 maintains the client key database file in non-volatile memory. As will be further described in greater detail, any time a client device 210 attempts to authenticate with the access point 220, the client device 210 presents the serial number corresponding to its client key 240. Using this client key serial number, the access point 220 retrieves the corresponding CK_IDS cryptographic key from the client key database file stored within the access point 220.

In an embodiment of the invention, each CK_IDS is encrypted in host computer 210A with AP_IDS prior to uploading to the access point 220. The client key database file within the access point 220 is a collection of client records. Each client record comprises the plain text serial number and the encrypted CK_IDS associated with the corresponding client key 240. To use the CK_IDS of the client key 240 when communicating with the client device 210, the access point 220 pulls the corresponding record and then decrypts the encrypted CK_IDS with AP_IDS.

Figure 8:
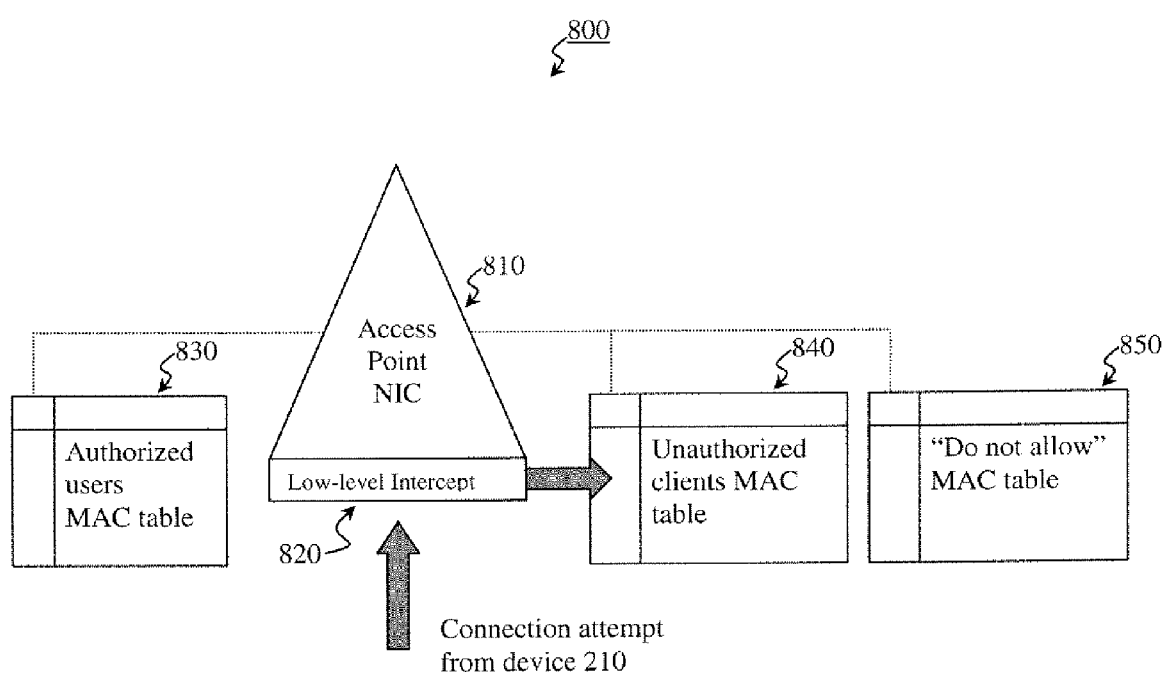
FIG. 8 illustrates an authentication system implemented at an access point according to an embodiment of the invention

The nerve center of the system is the AP software executing at access point 220. The AP software facilitates the authentication of a client computing device 210 attempting to access network 200. FIG. 8 illustrates an authentication system 800 implemented by the AP software at the access point 220 according to an embodiment of the invention. Particularly, authentication system 800 comprises a network interface card 810, a low-level interrupt 820, an authorized clients MAC table 830, an unauthorized client table 840, and a "do not allow" table 850. NIC 810 facilitates communications between the access point 220 and the client devices 210A-N. The authorized clients MAC table 830 comprises the MAC address of all client devices 210, which are presently authorized to communicate on the network 200. The unauthorized client table 840 comprises the MAC address of all client devices 210 pending authentication. The "do not allow" table 850 comprises the MAC address of all devices that have failed authentication. The low-level interrupt 820 is employed to place any unknown media access control (MAC) address received from a client device 210 in the unauthorized client table 840.

Figure 9A:
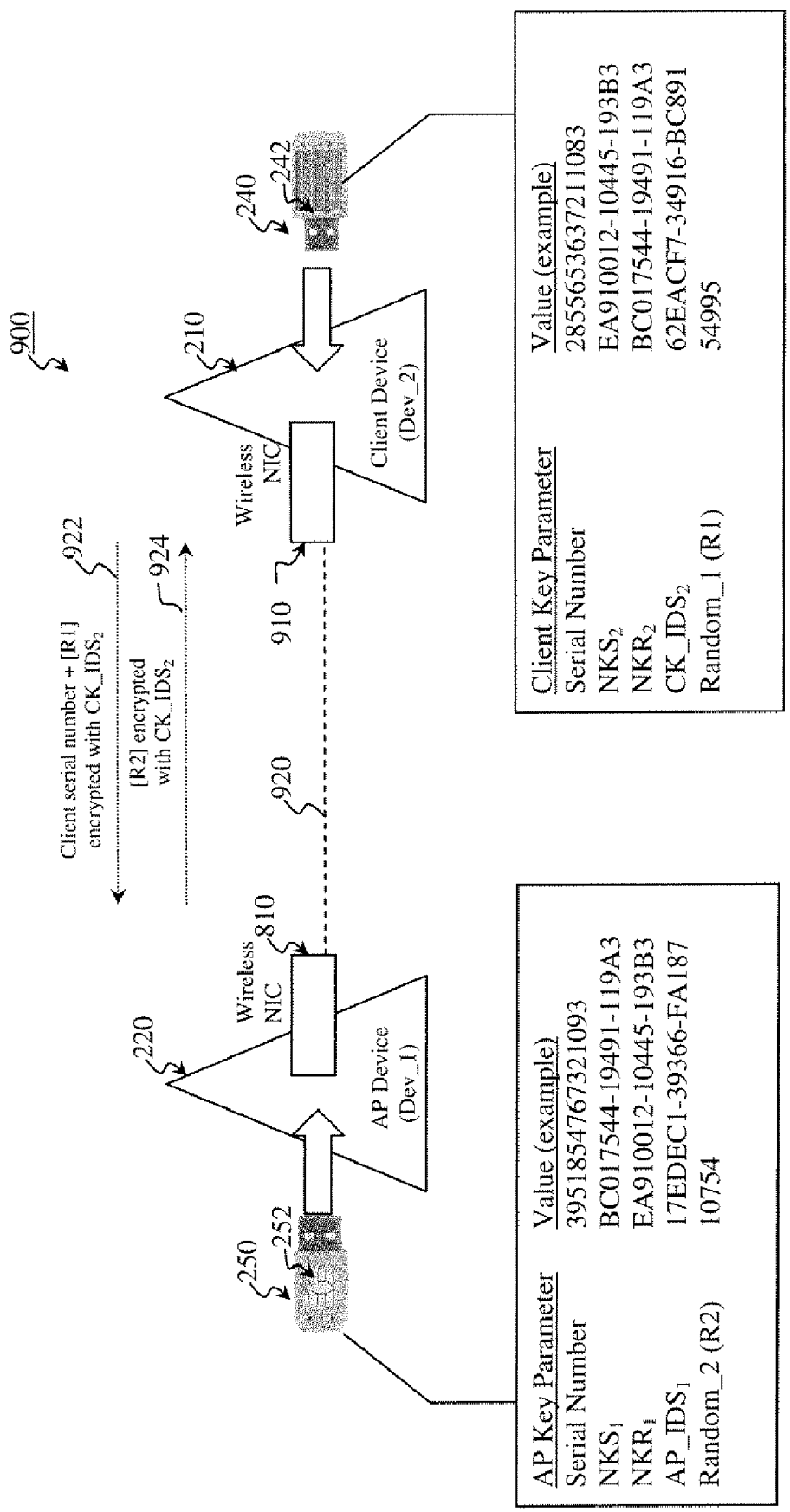
FIG. 9A illustrates exchange of authentication frames in a secure Wi-Fi network according to an embodiment of the invention.
Figure 10:
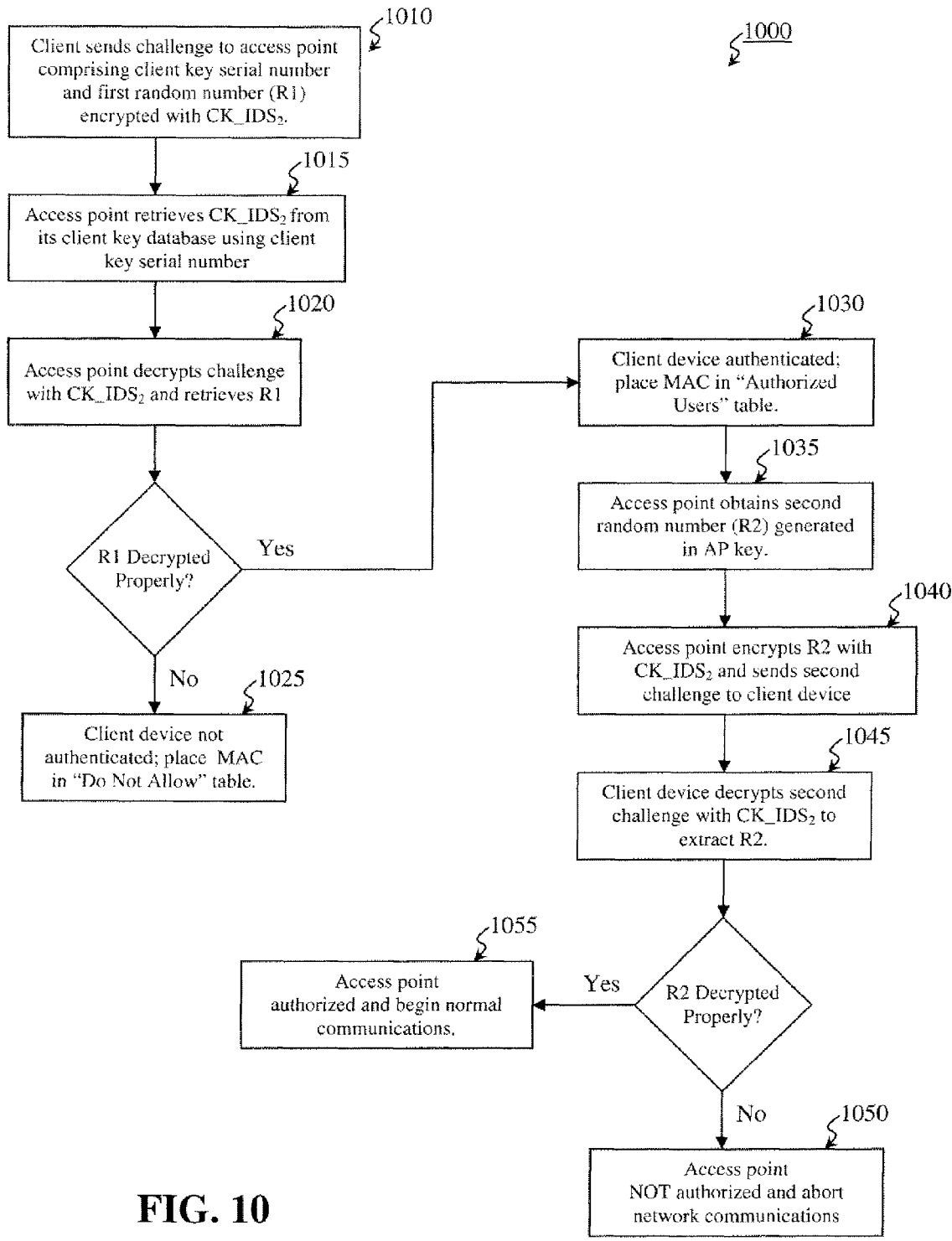
FIG. 10 illustrates a client device authentication process according to an embodiment of the invention.

The client device authentication process is now described with reference to FIGS. 9-10. Particularly, FIG. 9A illustrates the exchange of authentication frames between the client device 210 with a properly configured client key 240 installed and the access point 220 with a properly configured AP key 250 installed during the second step of authentication. FIGS. 9B-C illustrate an exemplary format and contents of these authentication frames. FIG. 10 illustrates an authentication process 1000 implemented by the access point 220 and the client device 210.

Referring to FIG. 9A, the access point 220 and the client device 210 via respective NICs 810 and 910 communicate with each other on a Wi-Fi channel 920. During the implementation of the authentication process 1000, two authentication frames 922 and 924 are exchanged via Wi-Fi channel 920. In the present embodiment, the network send/receive cryptographic keys are flipped between the access point 220 and the client device 210. In other words, the network send cryptographic key of the access point 220 is identical to the network receive cryptographic key of the client device 210, i.e., $NKR_1=NKS_2$ and $NKR_2=NKS_1$. The subscript designates which device the physical key resides in, e.g., "2" designates client device 210 and "1" designates access point 220. Example values of these parameters along with the serial numbers, random numbers, and secret cryptographic keys AP_IDS and CK_IDS are presented in the figure to better illustrated the authentication process. It is important to note that NKR and NKS are private cryptographic keys stored in the physical keys 230, 240A-N, and 250. In an alternative embodiment of the invention, other types of cryptographic keys such as public/private cryptographic keys may be employed, the implementation of which is apparent to one of ordinary skill in the art.

The format of the authentication frames follow a standard 802.11 authentication framing format, the implementation of which is apparent to one of ordinary skill in the art. As depicted in FIGS. 9B-9C, each frame comprises an authentication algorithm number preferably set to an integer number undefined in the 802.11 specifications, e.g., "3", thereby designated that the authentication process 1000 is to be implemented. Moreover, each frame further comprises an authentication transaction sequence number that is incremented at each stage in the process; a status code that is set to "0" if the stage is successful; and a challenge text field ("challenge") that comprises the particular authentication parameters. Optionally, a cyclic redundancy check (CRC) can be appended to each message to insure the data integrity of each frame. Once in the secure mode, the access point 220 or the client device 210 will not accept an authentication frame designating an authentication algorithm number other than "3".

Referring to FIG. 10, upon entering the communication range of a wireless Wi-Fi network, client device 210 sends (step 1010) the authentication frame 922 to the access point 220. The challenge of authentication frame 922 comprises the serial number of the client key 240 corresponding to the client device 210 attempting authentication and a first random number (R1) generated by SIM 242 of the client key 240. The challenge is encrypted with $CK\_IDS_2$, which is stored within SIM 242 of the client key 240. Upon reception of authentication frame 922, the client key serial number allows the access point 220 to retrieve (step 1015) the secret cryptographic key $CK\_IDS_2$ stored within the client key database file and associated with the client key 240 attempting authentication. The access point 220 then decrypts the challenge text with the $CK\_IDS_2$ (step 1020) to obtain the random number R1 generated by the client key 240. If the decryption process yields a null (empty) string, the access point 220 knows the client device 210 is not a trusted device and therefore places (step 1025) the MAC Address of the client device 210 in the "Do Not Allow" table 850. If the decryption process does not yield a 'null' or empty string, then the access point 220 knows that the client device 210 is a trusted component and places (step 1030) the MAC address of the client device 210 in the "Authorized Users Table" 830.

One of the quirks of the decryption process is that the process returns either a decrypted string or a null string. A null string is a telltale indicator that the encrypted data could not be decrypted. Thus, if the decrypted result is not a null string, it can be safely assumed that the encryption key matches the decryption key.

The access point 220 forms an authentication response frame 924 featuring a second challenge comprising a second random number R2 generated (step 1035) by the SIM 252 of the AP key 250, which is encrypted (step 1040) with the same $CK\_IDS_2$ associated with the client device 210. This second challenge within authentication frame 924 is sent to client device 210.

The client device 210 receives and decrypts (step 1045) the second challenge of authentication frame 924 using $CK\_IDS_2$ stored with SIM 242 to obtain decrypted R2. If the decryption process yields an empty string, the client device 210 aborts (step 1050) further communications with the access point 220. If the decryption process does not yield a 'null' or empty string, then the client device 210 is assured (step 1055) that it is talking to a trusted component. In other words, a properly decrypted R2 indicates to the client device 210 that the access point 220 knows its secret key and therefore is a trusted component. Both sides now know R1 and R2 and therefore must know the CK_IDS.

Although not required, as an added safety measure, frames 922 and 924 are each encrypted with the common network cryptographic keys, e.g., frame 922 with the client's NKS key and frame 924 with the access point's NKS key. Decryption is performed at each end with the respective NKR key.

Figure 11:
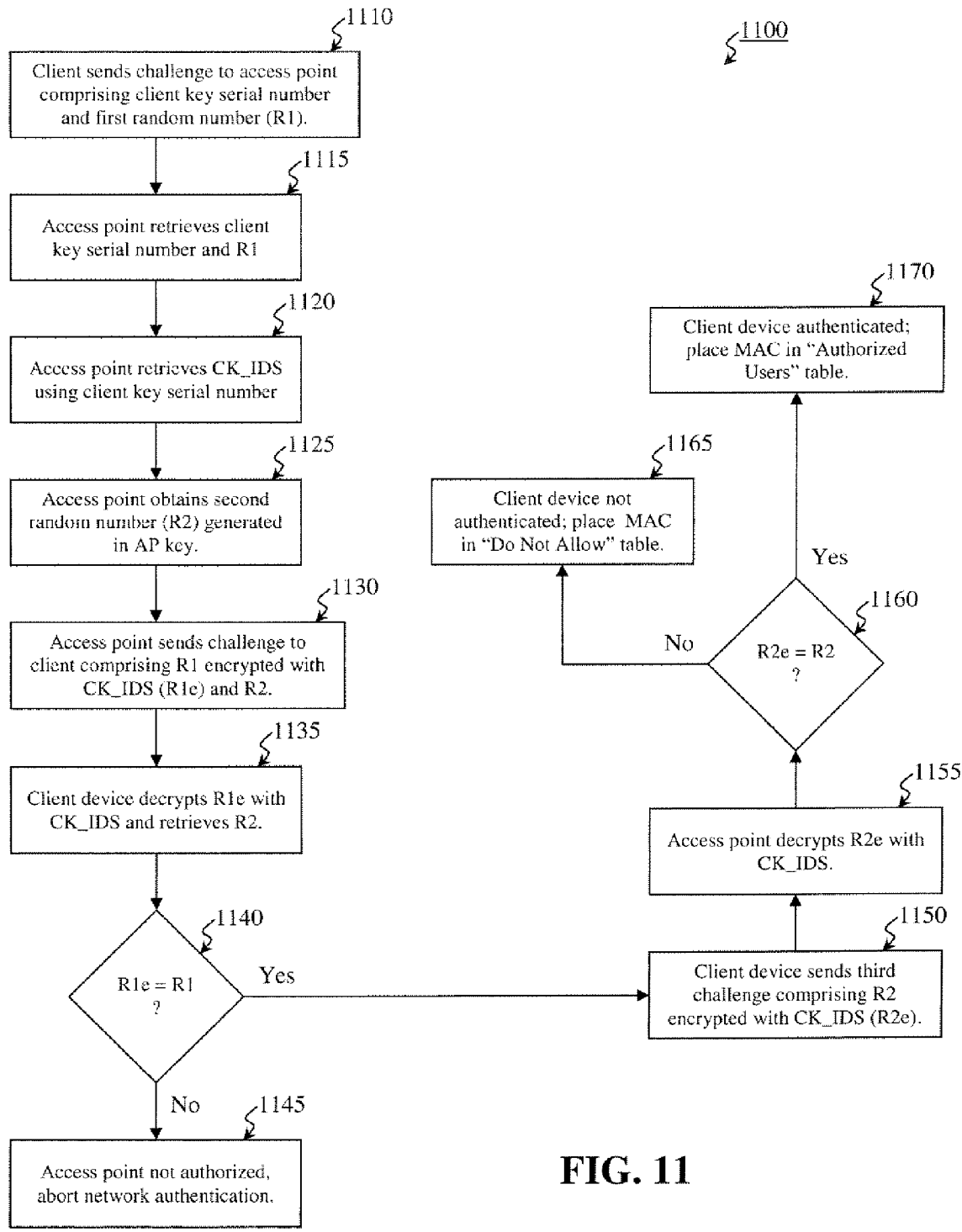
FIG. 11 illustrates a client device authentication process according to an alternative embodiment of the invention.

FIG. 11 illustrates an authentication process 1100 according to an alternative embodiment of the invention. Particularly, upon entering the communication range of a wireless Wi-Fi network, client device 210 sends (step 1110) sends a first challenge to the access point 220. This challenge comprises the serial number of the client key 240 corresponding to the client device 210 attempting authentication and a first random number (R1) generated by SIM 242 of the client key 240. The challenge is encrypted with $NKS_2$, which is stored within SIM 242 of the client key 240.

Upon reception of the first challenge, the access point 220 decrypts (step 1115) the challenge with $NKR_1$, which is stored within SIM 252 of the AP key 250 to extract the client key serial number and the first random number. The extracted client key serial number allows the access point 220 to retrieve (step 1120) the secret cryptographic key $CK\_IDS_2$ stored within the client key database file and associated with the client key 240 attempting authentication. The access point 220 then obtains (step 1125) a second random number (R2) generated in the SIM 252 of the AP key 250. The first random number R1 is encrypted with $CK\_IDS_2$ obtained from the client key database file. Encrypted R1 is not referred to as R1e. The access point forms a second challenge comprising R1e and R2. This second challenge is then encrypted with $NKS_1$ and sent (step 1130) to client device 210.

The client device 210 receives and decrypts the second challenge of authentication frame 924 using $NKR_1$ to obtain R1e and R2. R1e is then decrypted (step 1135) with $CK\_IDS_2$ from SIM 242. The client device 210 then compares (step 1140) R1 as originally sent with the R1e received to identify if they match. If they don't match, the client device 210 aborts (step 1145) further communications with the access point 220. If a match is found, i.e., R1e equals R1, the client device 210 knows the access point 220 is a trusted component.

The client device 210 responds to the access point 220 with a final challenge. This challenge comprises the second random number R2 encrypted at the access point 220 with the $CK\_IDS_2$. Encrypted R2 is now referred to as R2e. The client device 210 sends (step 1150) the third challenge encrypted with $NKS_2$ to the access point 220. The access point 220 decrypts (step 1155) the third challenge with $NKR_1$ and then R2e with $CK\_IDS_2$. The access point 220 then compares (step 1160) R2 as originally sent with the decrypted R2e received to identify if they match. If the random numbers do not match, the access point 220 knows the client device 210 is not a trusted device and therefore places (step 1165) the MAC Address of the client device 210 in the "Do Not Allow" table 850. If R2e equals R2, the access point 220 knows that the client device 210 is a trusted component and places (step 1170) the MAC address of the client device 210 in the "Authorized Users Table" 830.

In a related embodiment, the random numbers R1 and R2 are first encrypted with $CK\_IDS_2$ at the side of the connection where these numbers are generated. For example, the first challenge can comprise R1e instead of R1, which would then be returned in decrypted form to the client device 210 in the second challenge. Moreover, the second challenge can comprise R2e instead of R2, which would then be returned in decrypted form to the access point 220 in the third challenge.

The selection of the side that first encrypts these random numbers with $CK\_IDS_2$ is not important as long as a comparison is enabled between the random number as originally sent and the corresponding random number received in the subsequent challenge. Thus, enabling each side to determine whether the other side of the connection is employing an identical CK_IDS, and is therefore a trusted component.

Subsequent secure secret communications are implemented by a two-step encryption/decryption process according to an embodiment of the invention. First, there is the secret cryptographic key, e.g., MK_IDS, CK_IDS, or AP_IDS, stored in each of the master key 230, the client keys 230A-N, and the AP key 250. Each secret cryptographic key is initially generated randomly from and stored in the respective SIM token within the corresponding physical key. These secret cryptographic keys are never used directly to encrypt/decrypt communications, but are used as a starting point for a transposition process, which is described below, based on the two random numbers R1 and R2 generated during the authentication process.

In an embodiment of the invention, each secret cryptographic key is a 256-bit cryptographic key. Each of the bits are transposed according to a process using the first random number as the starting point and the second random number as the "skip" counter for stepping ahead to the next bit position to be transposed. The process results in a unique transposition of an original key that can be replicated exactly on each side of the communications link without any cryptographic key actually being transmitted. Since the access point 220 knows the secret cryptographic keys of each of the potentially connecting users, e.g., client devices 210A-N, the secret cryptographic key of the authenticated client device 210 can be used in conjunction with the two 'just-now-generated' random numbers to derive a 'new, one-time' cryptographic key for encrypting/decrypting data. Note that during the authentication process, the client key serial number is used as the identifier for the access point to obtain the client's secret cryptographic key, i.e., CK_IDS, from the client key database file. As there is no mathematical relationship between client key serial number and the CK_IDS, it is impossible to derive a calculated method of obtaining this secret cryptographic key.

Referring to FIGS. 12A-E, a 16-bit example of the transposition process is illustrated according to an embodiment of the invention. Using the two previously generated random numbers R1 and R2, we would take these two numbers MODULUS 16 and obtain the following two "new" numbers:

| Original Random Numbers | MOD 16 |
| --- | --- |
| R1 = 10754 | 2 |
| R2 = 54995 | 3 |

Figure 12A:
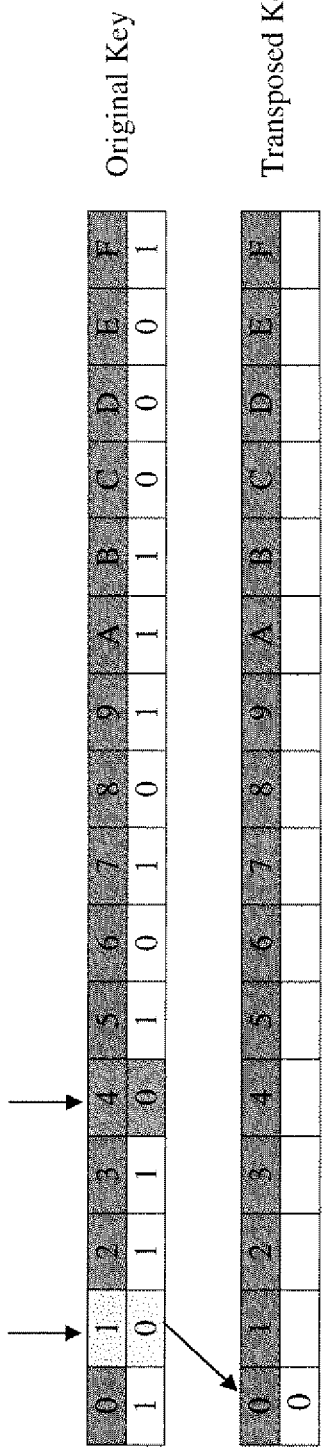
Figure 12B:
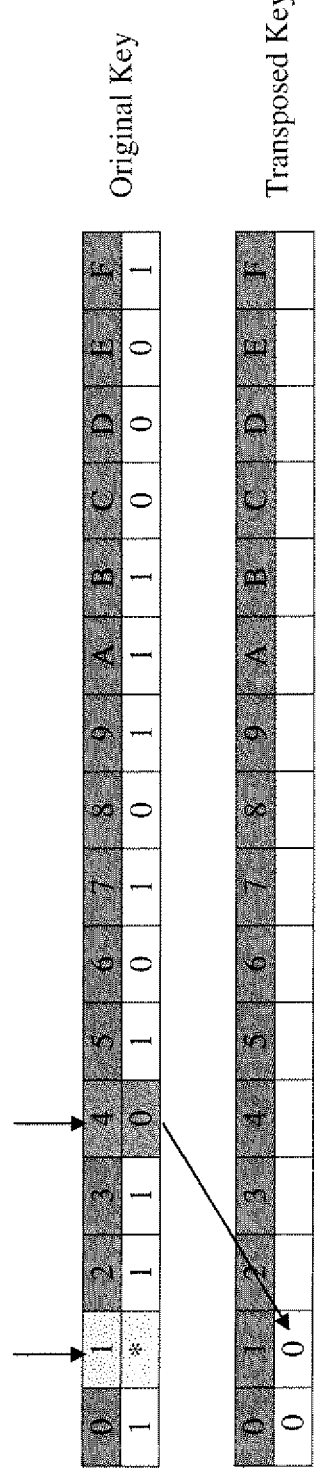

The random numbers are converted modulus the key length. The first random number R1 is used as an initial pointer into the table. Thus, if the first random (10754) number modulus is equal to (2), the 2nd bit is placed into the first bit position of the new key as shown in FIG. 12A. This 2nd bit position becomes the "pointer." The second random number is a skip counter used as an offset from the pointer. For example, if the second random modulus is equal to three (3), then the pointer moves three positions and picks up the value of the 4th bit in the table. The value of the 4th bit is placed in the 2nd bit position of the new key as shown in FIG. 12B. The process would repeat for each of the remaining bit positions.

Figure 12C:
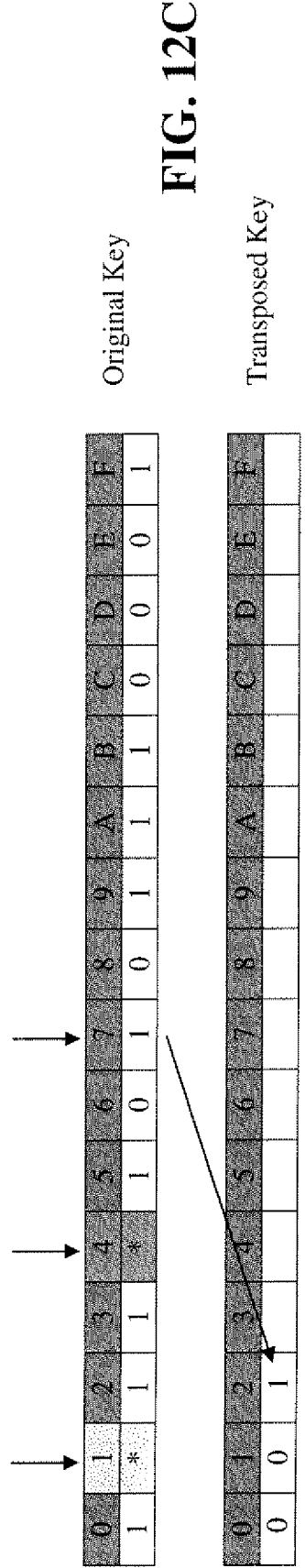

For example the value of the 7th, 10th, and 13th bits become the 3rd, 4th, and 5th bit positions of the new key as shown in FIGS. 12C-E. If the pointer lands on a bit-position previously used, it would increment by one position until an unused position is found. After all 16-bits have been transposed according to the two random numbers, the "new key" is used to encrypt/decrypt transmissions across the link.

In sum, no cryptographic keys of any type are ever transmitted between network devices. Only the serial number of the client's physical key is ever transmitted from the client side and even then, it is encrypted with the network cryptographic keys. No initialization vector (IV) is utilized and there are no restrictions on the key bytes used as in WEP. The two random numbers are generated uniquely for each end of the link by the link participants and last only for the current session. Each client/AP pair will have a unique pair of random numbers, which are always encrypted when sent. The CK_IDS of each client device key 240 is used in conjunction with the two random numbers to further generate a special transposition cryptographic key that is again unique for both participants for that session. As this special cryptographic key used for data transmissions (after authentication) is always a random transposition of the CK_IDS cryptographic keys, extraction of the key is made extremely difficult because each client for each session uses in effect a totally different cryptographic key. All cryptographic keys for authentication are maintained in a secure database at the host computer and portions of this database are securely transferred to each access point allowing the access point to retrieve the user's secret key based on his serial number.

Other embodiments and uses of the invention will be apparent to those skilled in the art from consideration of the specification and practice of the invention disclosed herein.

Although the invention has been particularly shown and described with reference to several preferred embodiments thereof, it will be understood by those skilled in the art that various changes in form and details may be made therein without departing from the spirit and scope of the invention as defined in the appended claims.

The invention claimed is:

1. A method for remote provisioning of a cryptographic key database file on an access point computing device on a communications network also including a host computing device having a cryptographic key database stored thereon and one or more client computing devices, the method comprising the steps of:

selecting the access point computing device;
   authenticating the selected access point computing device;
   obtaining an access point identifier associated with the selected access point computing device;
   obtaining from the cryptographic key database, an access point cryptographic secret key associated with said access point identifier and the cryptographic key database;
   constructing the cryptographic key database file, wherein the cryptographic key database file comprises one or more client identifiers associated with the respective one or more client computing devices, and one or more client key cryptographic secret keys associated with cryptographic keys of the respective client computing devices;
   encrypting the cryptographic key database file using the access point cryptographic secret key; and
   receiving the encrypted cryptographic key database file at the selected access point computing device.

2. The method of claim 1, wherein the cryptographic keys are public/private cryptographic keys.

* * * * *